United States Patent
Struye et al.

(10) Patent No.: US 6,995,347 B2
(45) Date of Patent: Feb. 7, 2006

(54) SHADING CORRECTION METHOD AND APPARATUS

(75) Inventors: Luc Struye, Mortsel (BE); Paul Leblans, Kontich (BE)

(73) Assignee: Agfa-Gevaert N. V., Mortsel (BE)

( * ) Notice: Subject to any disclaimer, the term of this patent is extended or adjusted under 35 U.S.C. 154(b) by 294 days.

(21) Appl. No.: 10/667,818

(22) Filed: Sep. 22, 2003

(65) Prior Publication Data

US 2004/0155209 A1 Aug. 12, 2004

Related U.S. Application Data

(60) Provisional application No. 60/417,495, filed on Oct. 9, 2002.

(30) Foreign Application Priority Data

Sep. 25, 2002 (EP) .................................. 02102381

(51) Int. Cl.
*H01L 27/00* (2006.01)

(52) U.S. Cl. .................................... 250/208.1; 250/587
(58) Field of Classification Search .................... None
See application file for complete search history.

(56) References Cited

U.S. PATENT DOCUMENTS

| 4,785,353 A | | 11/1988 | Seim |
| 5,832,055 A | * | 11/1998 | Dewaele ..................... 378/62 |
| 6,350,985 B1 | | 2/2002 | Rodricks et al. |

FOREIGN PATENT DOCUMENTS

| EP | 0 823 691 A1 | 2/1998 |
| EP | 02 10 2381 | 3/2003 |

* cited by examiner

*Primary Examiner*—Que T. Le
(74) *Attorney, Agent, or Firm*—John A. Merecki; Robert A. Sabourin

(57) ABSTRACT

A method and apparatus for correcting a signal representation of a radiation image of an object wherein correction by means of correction values is performed simultaneously with image read out.

8 Claims, 3 Drawing Sheets

SHADING CORRECTION METHOD AND APPARATUS

This application claim the benefit of Provisional application Ser. No. 60/417,495, filed Oct. 9, 2002.

FIELD OF THE INVENTION

The present invention relates to medical imaging. The invention more specifically relates to correction of medical images for non-uniform sensitivity of image detectors used in medical imaging.

BACKGROUND OF THE INVENTION

In the field of digital imaging a wide variety of image acquisition techniques have been developed that render a digital representation of a medical image.

Among such techniques are computerised tomography, nuclear magnetic resonance, ultrasound, detection of radiation by means of a CCD sensor or a video camera, radiographic film scanning, direct radiography techniques using radiation sensitive detector elements etc.

In still another technique a radiation image, e.g. an X-ray image of an exposed object (such as the body of a patient) is stored in a photostimulable phosphor screen. Such a photostimulable phosphor screen comprises a layer of photostimulable luminescent material and a binder. The photostimulable luminescent material is for example a europium-activated barium fluoro-halide phosphor or a Cs-phosphor.

The phosphor is characterised in that it can be energised to an excited state by X-rays and can then be stimulated by light within a first wavelength range to return to a ground state by emission of light within a second wavelength range.

In order to read the image that has been stored in an exposed screen, the screen is scanned two dimensionally with stimulating light.

Light emitted upon stimulation is guided to an opto-electric transducer (or transducer array) that converts the detected light into a digital image representation.

Systems exist that provide enhanced image quality by double sided read out of an exposed screen.

In particular in the field of medical imaging where a radiation image of a patient's body is used by a physician to make a diagnosis, it is extremely important that all imaging defects which may affect the diagnosis are detected and corrected.

In the state of the art a method is known to correct a radiation image read out of a photostimulable phosphor screen for non-uniformity of the detector.

According to this method, a flat field exposure of the detector is performed prior to exposure and read out of a diagnostic image. The image corresponding with the flat field exposure is read out and stored.

When a diagnostic image is read out, this image is also stored. Next, in order to perform correction, both images are retrieved for memory and each of the pixels of the diagnostic image is corrected by means of the corresponding (in register) pixel values of the image corresponding with the flat field exposure.

In the case of double sided read out, this procedure can be applied to the signal read out of each side of the detector. Each of the 'partial image representations' read out of one side of the detector is corrected with a correction signal representing an image obtained by flat field exposure of the relevant side of the detector.

Since in either of the cases this correction consists a pixel-by-pixel correction of at least two images that need to be retrieved from memory(pixel-wise division or multiplication of two images per side), the operation is time-consuming and may negatively affect the throughput of the system.

For dual side reading this decrease of the throughput is even twice as important.

It is an aspect of the present invention to overcome the prior art disadvantages.

SUMMARY OF THE INVENTION

The objects of the present invention are achieved by a method of correcting a signal representation of a radiation image of an object comprising the steps of storing a matrix of correction values in a memory device, said correction values being obtained by read out of an image stored by a radiation detector that has been subjected to a flat field exposure, exposing said radiation detector to a radiation image of an object, generating for each pixel of said radiation image of said object a digital signal representation of the pixel value, characterised in that immediately following generation of said digital pixel value, the pixel value is applied to a processing unit, simultaneously a correction value pertaining to said pixel is read from said memory and applied to said processing unit, said pixel value is corrected by means of said correction value in said processing unit.

Correction can be performed by dividing each pixel value by the corresponding correction value.

Alternatively each pixel can be multiplied by the reciprocal of the corresponding correction value, which can be calculated in advance before storing it in the memory device.

In a preferred embodiment the image corresponding with the flat field exposure is filtered by means of a digital filter in order to eliminate high frequencies. This embodiment is advantageous in that noise present in the flat field image is diminished and consequentially the signal-to-noise ratio is not adversely affected by the correction.

In a specific embodiment the memory capacity required to store the correction values is decreased by not determining the pixel values of the flat field image in every pixel. For example the pixel value in every tenth row, twentieth, thirtieth etc. and every tenth, twentieth, thirtieth column is stored. An electronic signal processing module then generates a number of values identical to determined values to fill in the missing pixel values.

The phrase 'generating for each pixel of said radiation image of said object a digital signal representation of the pixel value' is to be interpreted as including the situation wherein a detector is subjected to double-sided read out.

In this case the digital signal representation of a pixel obtained from each side can be corrected by means a correction value being obtained by read out of an image stored by the relevant side of the radiation detector having been subjected to a flat field exposure.

Another aspect of this invention relates to an apparatus for generating a radiation image of an object comprising image acquisition means for detecting a radiation image of said object by means of a radiation detector and for generating an electric signal representation of pixel values of said radiation image, memory means for storing a matrix of correction values obtained by read out of a radiation image stored by a radiation detector that has been subjected to a flat field exposure, a hard ware signal processing unit having a first and a second input, said first input being coupled to said image acquisition means for consecutively receiving the electric signal representation of individual pixel values of said radiation image of an object immediately following generation of said electric signal representation and said second input being coupled to said memory device for simultaneously receiving a corresponding correction value retrieved from said memory device, said hard ware signal processing unit for correcting a pixel value received at said first input by means of a corresponding correction value simultaneously received at said second input.

Since the pixel-by-pixel read out of the detector occurs simultaneously with the pixel-by-pixel correction of the image, no additional time is required for the correction and the throughput of the system is thus not affected.

In a specific embodiment a filter can be provided for low pass filtering the matrix of correction values.

It is also possible to reduce the required storage capacity of the memory by not determining the pixel values of the flat field image in every pixel. For example the pixel values in every tenth row, twentieth, thirtieth etc. and every tenth, twentieth, thirtieth column is stored. An electronic signal processing module is then arranged to generate a number of values identical to determined values to fill in the missing pixel values.

In case of dual-sided reading of a detector, e.g. a photostimulable phosphor screen, separate hardware processing units can be provided for correcting the images read out from either side of the detector.

DETAILED DESCRIPTION OF THE INVENTION

Figure 1:
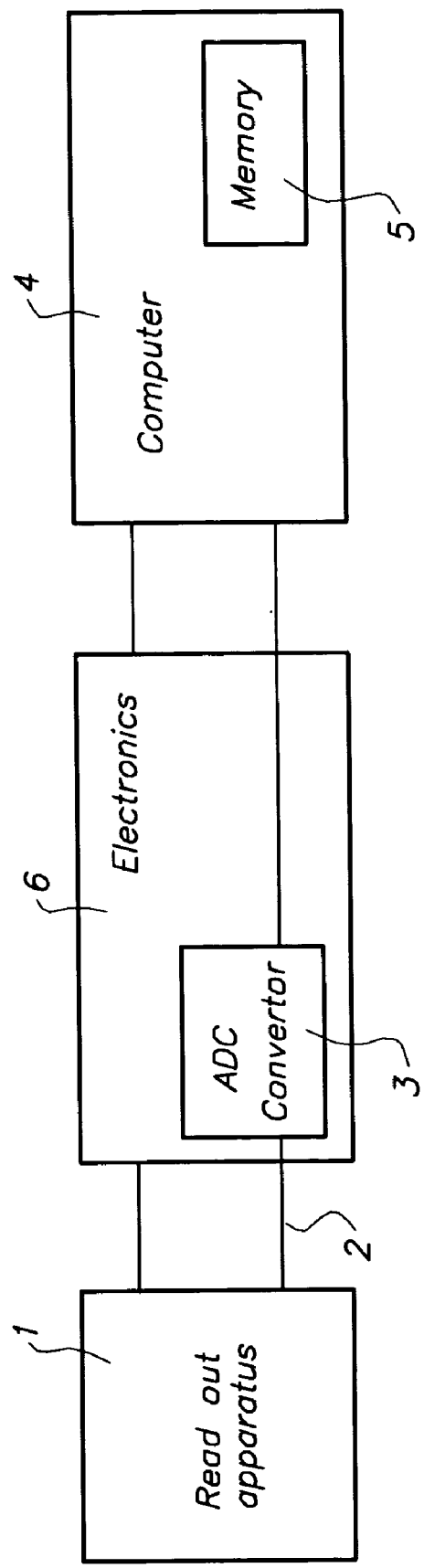
FIG. 1 shows a prior art embodiment of a read out device comprising a correction unit.

FIG. 1 schematically shows the prior art situation.

A read out device 1 has an output terminal 2 connected to an analog-to-digital convertor 3. The output of analog-to-digital convertor is connected to the input of a computer 4.

Computer 4 has a memory 5 wherein a digital signal representation of an image read out of the detector when having been exposed to a flat field exposure, has been stored in advance. The digital representation of the flat field image represents a matrix of correction values.

Electronic circuit 6 controls the operation of the devices.

The operation of the prior art device is as follows:

First the radiation image of an object is detected in read out device 1 and an electric signal representation is generated. For example the radiation image is read out of a photostimulable phosphor screen by scanning the screen with stimulating radiation, detecting the image-wise modulated light emitted upon stimulation and converting the image-wise modulated light into an analog signal representation. This signal is then digitised in analog-to-digital convertor 3 and applied to computer 4.

In computer 4 a signal representation of a flat field exposure, stored in advance in memory 5, is retrieved and the signal representation of the image is pixel-wise corrected with the signal representation of the flat field exposure.

Figure 2:
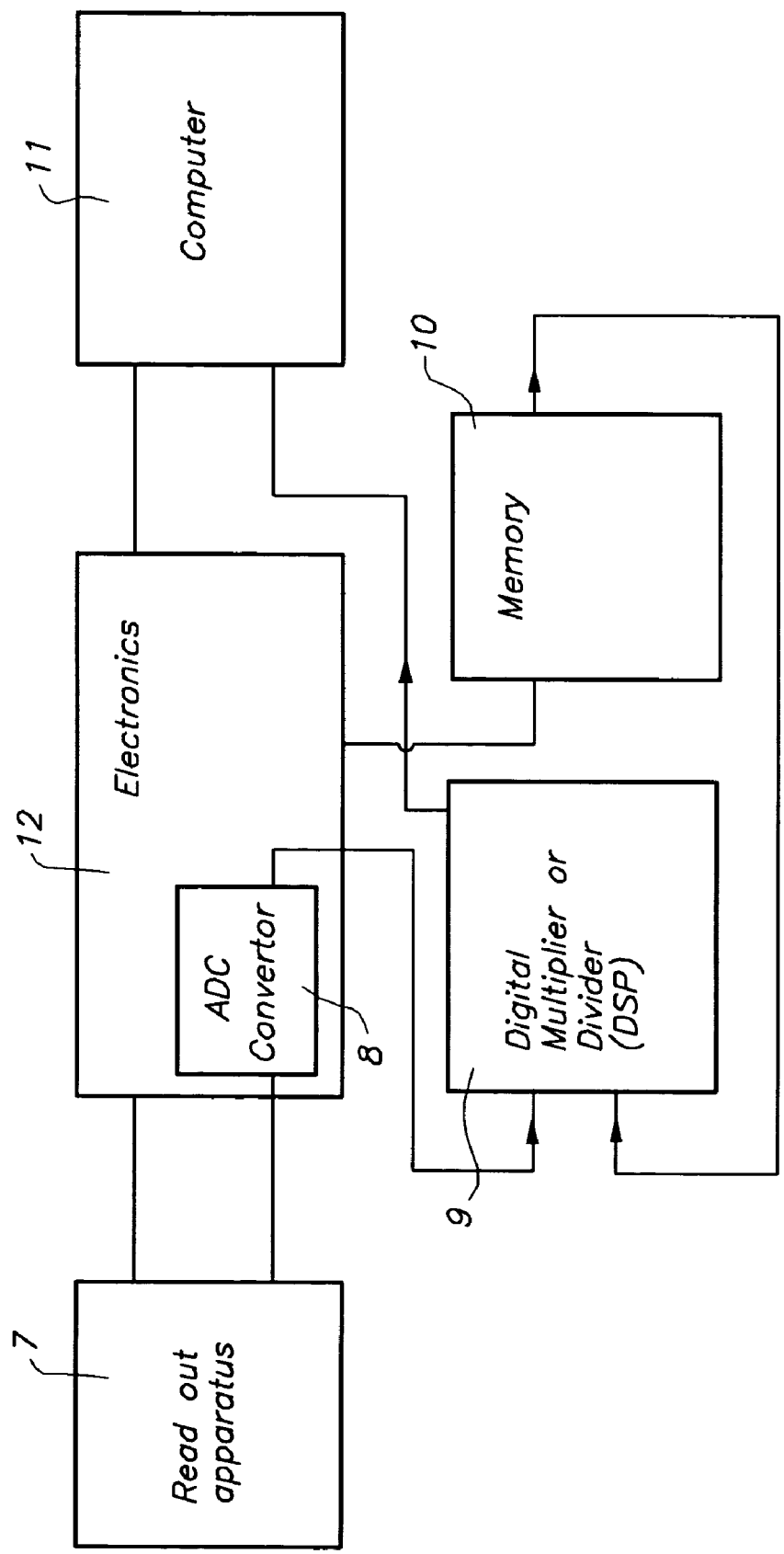
FIG. 2 shows a read out device comprising a digital correction unit according to the present invention.

FIG. 2 shows a first embodiment of a device according to the present invention.

The device comprises a read out apparatus 7 for reading an image that has been detected by a detector.

The output of the detector is coupled to an analog-to-digital convertor 8 the output of which is in its turn coupled to a digital signal processor 9.

A memory device 10, coupled to the input of the signal processor 9 has been loaded with a signal representation of an image corresponding with a flat field exposure.

The device further comprises a computer 11 to which the processed signal can be applied.

Electronic circuit 12 is arranged to control the operation of the devices.

Examples of digital signal processing devices are the following types made by Texas Instruments: SN54LS261 or SN74LS261 which are 2 bit by 4 bit multipliers. The computation time is typically 25 ns (max. 45 ns).

Other suitable devices are SN54284 and SN 54285 which are 4 bit by 4 bit parallel binary multipliers (max. computation time: 60 ns).

The operation of the device is as follows.

Read out apparatus 7 generates an analog output value for each pixel that is read out of a detector wherein a radiation image of an object has been stored.

Each read out analog pixel value is digitised in analog-to-digital converter 8 and applied to a hard ware digital signal processor computer 9.

The digital correction value corresponding with the same location on the detector is retrieved from memory 10.

This retrieved value is also applied to digital signal processor 9 and the digital pixel value is corrected by multiplication or division with the retrieved correction value.

Figure 3:
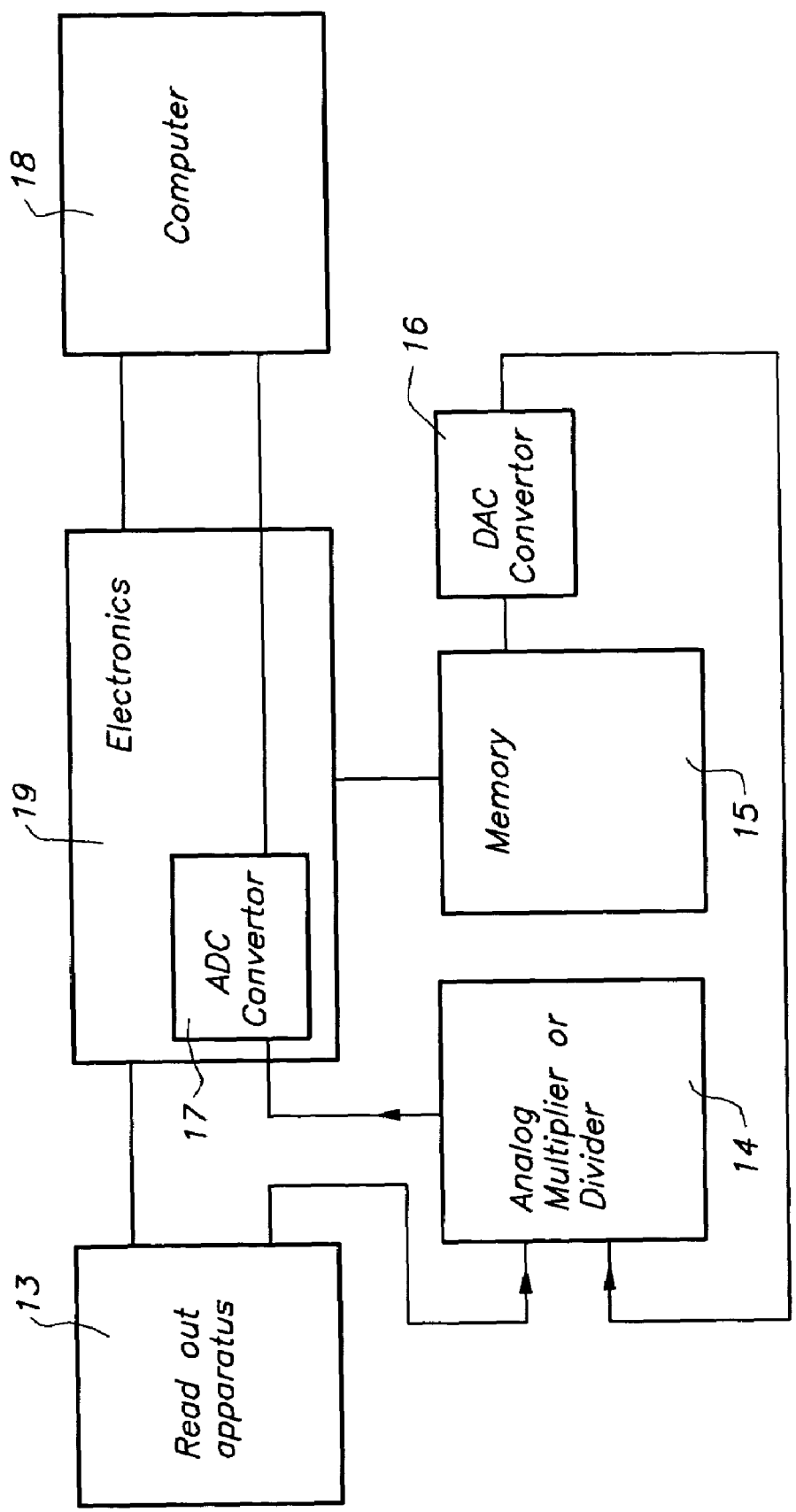
FIG. 3 shows a read out device comprising an analog correction unit according to the present invention.

FIG. 3 shows a second embodiment according to the present invention.

The device likewise comprises a read out apparatus 13 for reading an image that has been detected by a detector.

The output of the read out apparatus is coupled to an analog signal processing unit 14.

The apparatus further comprises a memory device 15 that has been loaded with a signal representation of an image corresponding with a flat field exposure.

The memory device is coupled to the input of a digital to analog converter 16, the output of which is coupled to the second input terminal of the analog signal processing unit 14.

The output of signal processing unit 14 is coupled to an analog-to-digital converter 17, the output of which is coupled to computer 18. Control electronics 19 are arranged to control the operation of the scanner, the analog to digital converter and the memory device.

Examples of analog multipliers and dividers are the following devices manufactured by the company Analog Devices: AD 834AD 835AD 734AD 633AD 534MLT 04.

Digital signal processing chips such as ADSP 2185ADSP 2186ADSP 2195 and ADSP 2196 can also be used. These devices operate at a clock frequency of 160 MHz. They are very flexible.

The operation of the device is as follows.

Read out device 13 generates an analog output value for each pixel that is read out of a detector wherein a radiation image of an object has been stored.

The analog pixel value is applied to a first input terminal of analog processor 14.

For each pixel value the digital correction value corresponding with the same location on the detector is retrieved from memory 15 and converted into a corresponding analog value in digital-to-analog converter 16. The converted value is applied to the second input terminal of analog processor 14.

In the processor a read out pixel value is corrected by multiplication with or division by the analog correction value corresponding with the same location on the detector.

The result of this operation is fed into analog to digital converter 17 and may be applied to computer 18 for occasional further processing.

The invention claimed is:

1. A method of correcting a signal representation of a radiation image of an object comprising the steps of
    storing a matrix of correction values in a memory device, said correction values being obtained by read out of an image stored by a radiation detector that has been subjected to a flat field exposure,
    exposing said radiation detector to a radiation image of an object,
    generating for each pixel of said radiation image of said object a signal representation of the pixel value, characterised in that
    immediately following generation of said signal representation of a pixel value, the signal representation is applied to a processing unit,
    simultaneously a correction value pertaining to said pixel is read from said memory and applied to said processing unit,
    said signal representation is corrected by means of said correction value in said processing unit.

2. An apparatus for generating a radiation image of an object comprising
    image acquisition means for detecting a radiation image of said object by means of a radiation detector and for generating an electric signal representation of pixel values of said radiation image,
    memory means for storing a matrix of correction values obtained by read out of a radiation image stored by a radiation detector that has been subjected to a flat field exposure,
    a hard ware signal processing unit having a first and a second input,
        said first input being coupled to said image acquisition means for consecutively receiving the electric signal representation of individual pixel values of said radiation image of an object immediately following generation of said electric signal representation and
        said second input being coupled to said memory device for simultaneously receiving a corresponding correction value retrieved from said memory device,
    said hard ware signal processing unit for correcting a pixel value received at said first input by means of a corresponding correction value simultaneously received at said second input.

3. An apparatus according to claim 2 wherein said signal processing unit is a digital signal processing unit and said first input is coupled to said image acquisition means via an analog-to-digital converter.

4. An apparatus according to claim 2 wherein said signal processing unit is an analog signal processing unit and said memory is coupled to said image acquisition means via a digital-to-analog converter.

5. An apparatus according to claim 2 wherein said image acquisition means is arranged for double-sided reading of a radiation detector.

6. An apparatus according to claim 3 wherein said radiation detector is a photostimulable phosphor screen.

7. An apparatus according to claim 2 provided with a low pass filter for filtering said matrix of correction values.

8. An apparatus according to claim 2 wherein said matrix of correction values has a lower number of pixels than the detected radiation image and wherein identical correction values is applied to at least some different pixels.

* * * * *